United States Patent [19]

Sampey

[11] 4,202,016
[45] May 6, 1980

[54] DIGITAL MAGNETIC DATA STORAGE AND RETRIEVAL USING AUDIO ANALOG RECORDING TECHNIQUES

[76] Inventor: Harry R. Sampey, Box 484, Vanderbilt, Pa. 15486

[21] Appl. No.: 873,543

[22] Filed: Jan. 30, 1978

[51] Int. Cl.² ............................................. G11B 5/09
[52] U.S. Cl. ....................................... 360/40; 360/41; 360/46
[58] Field of Search ..................... 360/68, 42, 40, 39, 360/41, 46

[56] References Cited

U.S. PATENT DOCUMENTS

| | | | |
|---|---|---|---|
| 3,376,566 | 4/1968 | Coccagna | 360/41 |
| 3,562,724 | 2/1971 | Adler et al. | 360/41 |
| 3,725,885 | 4/1973 | Anderson | 360/42 |
| 3,840,891 | 10/1974 | Hellwerth | 360/40 |

OTHER PUBLICATIONS

"Byte"—Feb. 77, vol. 2, #2, pp. 24-31 & 82-85.
"Byte"—Jan. 77, vol. 2, #1, pp. 34-41.
"Low Cost Stereo Recorders Can Adapt to Digital Data" by Newton et al., Electronics vol. 43, #14, 7/70.

Primary Examiner—Vincent P. Canney
Attorney, Agent, or Firm—Sughrue, Rothwell, Mion, Zinn and Macpeak

[57] ABSTRACT

Method and apparatus are disclosed for storing and recovering a digital signal indicative of digital data wherein an audio cassette tape recorder is used to record, in analog form, digital data. The playback signal is processed through circuitry to produce one signal indicative of positive peaks in the playback signal, and a second signal indicative of negative peaks. The set and reset terminals of a flip-flop are responsive respectively to the latter two signals so as to reconstruct the original data signal at the output of the flip-flop.

9 Claims, 1 Drawing Figure

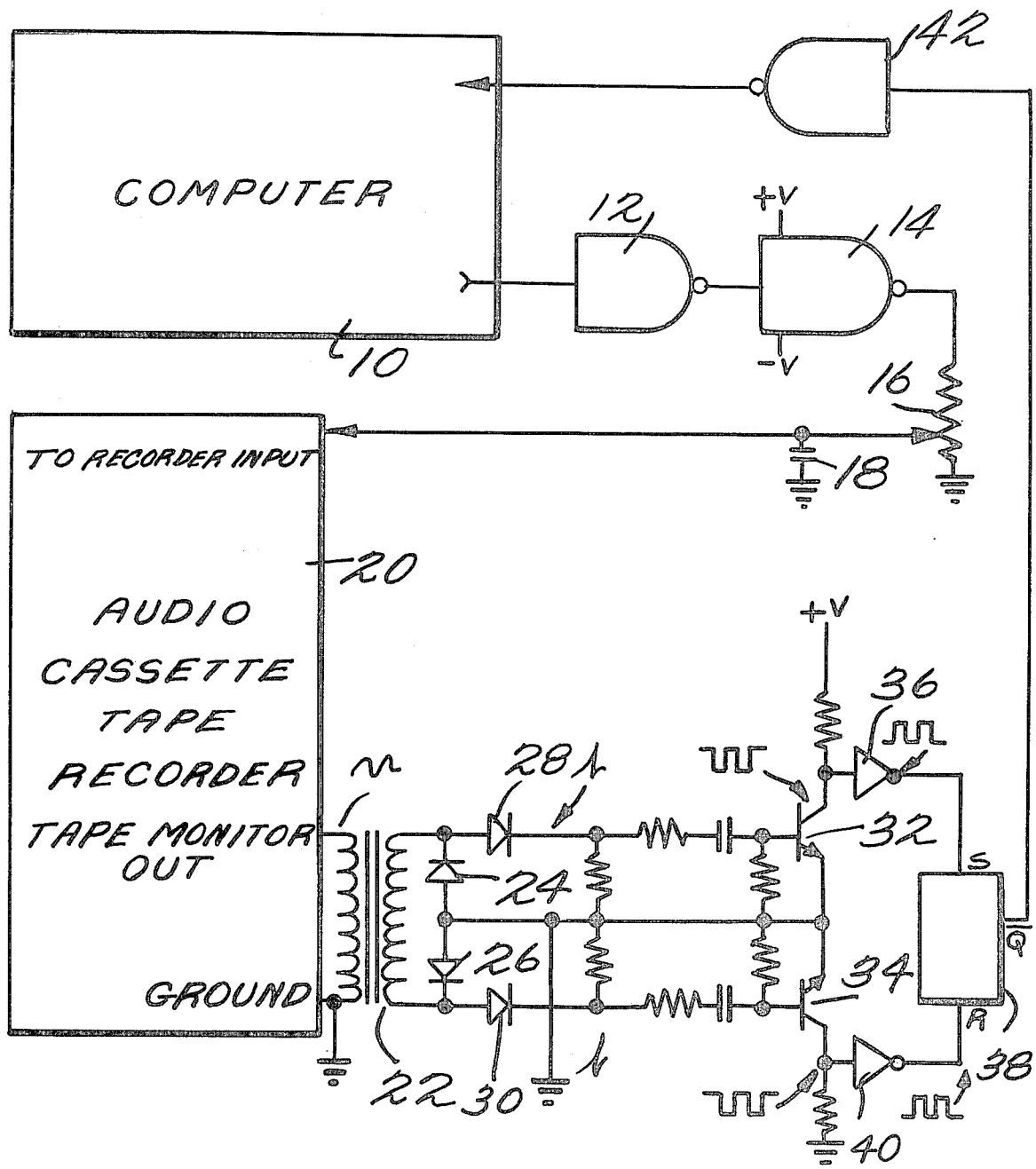

DIGITAL MAGNETIC DATA STORAGE AND RETRIEVAL USING AUDIO ANALOG RECORDING TECHNIQUES

The present invention relates to method and apparatus for storing and recovering digital data on magnetic recording tape, and more specifically to the use of an audio cassette tape recorder to record in analog form digital data wherein as many as 5,120 bits of data may be accurately recorded and later recovered in each inch of each track of data recorded on the tape.

Many fields, particularly the computer field, have experienced the need for an inexpensive method of storing large amounts of digital data on a readily available storage media. Depending on the application, mass storage of data is often accomplished by use of magnetic tape in the form of cassettes, cartridges or open reels. Flexible magnetic discs are also available, but in all of these methods there are limitations which must be considered, such as maximum density, cost and adaptability to the application.

If the digital data to be recorded and retrieved is sequential in nature, this invention permits an inexpensive audio cassette to be used to store large amounts of digital data with an excellent error rate. For example a single track audio cassette with a recording time of one hour on each side can store 34.5 megabits of data per side for a total of 96.0 megabits per cassette. If the cassette is recorded in two track binaural, as many as 138.2 megabits may be recorded.

The cassette tape package was designed to inexpensively record and reproduce signals. However, advances in cassette technology in recent years have brought about a division in the design of cassettes and cassette drives. Although the physical dimensions remain unchanged, the cassettes are now designed for either audio or digital applications. As the minicomputer market began to flourish, engineers adopted the cassette and cassette drive to accept computer data as an economic method of storing digital data. Various techniques were and still are being used to record digital data such as, for example, frequency shift keying (FSK) between two audio frequencies each respectively representing the binary codes for one and zero. Although this method is generally limited to a density of approximately 160 bits per inch, it can be practiced on a standard audio cassette drive.

To increase the storage capacity and speed, digital tape drives were developed employing DC responsive tape saturation circuitry. This technique provides an increase in the data storage per inch of tape; however, 899 bits per inch is generally the maximum density achieved with this method using cassettes. High data rates are, of course, possible if the tape is operated at high speeds in order to avoid exceeding 800 bits per inch but this cannot increase the amount of data stored on each cassette.

A number of prior patents describe various methods and apparatus specifically directed to digital recordation of binary data on special digital recorders. For example:

| Patent Number | Inventor |
| --- | --- |
| 2,824,776 | Elovic et al |
| 3,581,297 | Behr et al |
| 3,588,836 | Frazier |

-continued

| Patent Number | Inventor |
| --- | --- |
| 3,719,934 | Behr et al |

Since the audio cassette recorder tape speed is typically 1.875 inches per second, 5,120 bits of data must be recorded on each inch of tape in order to store data at the usual standard of 9,600 bits per second. As mentioned above, most special purpose digital cassette recorders cannot store more than 800 bits per inch due to flux density crowding.

The use of general purpose lower cost audio cassette recorders for recording digital data has in the past achieved only limited success. As discussed above, the use of FSK encoding (an audio method) limits the recording density to about 160 bits per inch. Nevertheless, audio cassette recorders have numerous potential advantages over digital cassette recorders in several practical ways. Millions of audio cassette recorders have been produced and sold around the world. A quality audio recorder represents years of engineering experience and has served a broad audio market. A well designed audio cassette recorder with many optional features may be one-fifth of the cost of a comparable digital cassette recorder with limited features. Therefore, the successful economic use of audio cassette recorders to record digital data would provide many practical advantages.

A number of systems using audio cassette tape recorders to record digital data are known in the art. U.S. Pat. No. 3,223,929 to Hofstad et al. discloses an FSK demodulator, which system has the inherent limitations as described above. A number of other systems are known involving extremely complex circuitry to achieve a satisfactory result with an audio cassette tape recorder. For example:

| Patent Number | Inventor(s) |
| --- | --- |
| 4,001,563 | Bied-Charreton et al |
| 4,001,564 | Bied-Charreton et al |
| 3,786,201 | Myers et al |
| 3,881,183 | Weisbecker |

U.S. Pat. No. 3,760,388 to Schmitz et al. discloses the mixing of digital data with an audio signal in an audio magnetic recording system so that the digital information is stored in the form of discrete audible tone bursts representative of the state of each bit of digital information. It is also noted that delay line type of digital memories often have outputs which look something like an analog output signal and there are many known circuits for processing such signals. For example, U.S. Pat. No. 3,727,144 to Senoo is representative of such prior art although it is not believed to be directly analogous to the art of magnetically recording digital data on a moving magnetic media.

SUMMARY OF THE INVENTION

The present invention overcomes many of the problems inherent in the prior art by providing a very simple electrical circuit for interfacing a computer with an audio digital cassette tape recorder so that such lower cost tape recorder can be used to record data from the computer at a very high effective density. It has been discovered that maintaining the recording levels so that the magnetic tape does not saturate, permits high density to be achieved without adverse increases in the error rate. Decoding is accomplished simply by isolating and separately detecting the positive and negative flux transitions and using these signals to set and reset respectively a flip-flop. The positive and negative flux transitions correspond to transitions in the data between zero to one and one to zero respectively in the standard NRZ recording mode currently in general use.

BRIEF DESCRIPTION OF THE DRAWING

These and other objects and advantages of the present invention will become more apparent and more readily appreciated from the following detailed description of the presently preferred exemplary embodiment of the invention taken in conjunction with the drawing which is a schematic representation of an exemplary circuit diagram.

DETAILED DESCRIPTION OF THE INVENTION

Referring now to the drawing, the data to be recorded is supplied conventionally by computer 10 to line receiver 12. Receiver 12 may be any receiver known in the art, but may conveniently be the MC1489 receiver manufactured by Motorola. After the computer output is processed by line driver 14, the resulting signals are supplied to potentiometer 16, used as a voltage divider to lower the voltage levels to approximately 0.5 volts peak to peak. Small capacitor 18 serves to reduce high frequency transition conditions resulting from the square-wave output of computer 10. The resulting signal is within the frequency limitation of the recorder and is provided to the input of audio cassette tape recorder 20. Recorder 20 is a standard audio cassette recorder in that the residual magnetic intensity recorded on the tape is proportional to the amplitude of the electrical current causing the recording (i.e., the tape is not saturated), and the input and output of recorder 20 are AC coupled.

Upon retrieval of the data from the tape, the available cassette recorder output signal is supplied to transformer 22. The terminals of an output winding of transformer 22 are connected respectively to the cathodes of diodes 24 and 26. The anodes of diodes 24 and 26 are connected to ground. The same terminals of transformer 22 are also connected respectively to diodes 28 and 30, the cathodes of which are connected respectively to the base of transistors 32 and 34. The emitters of transistors 32 and 34 are connected to ground, with the collectors connected through a resistor respectively to a positive voltage and to ground. The set input of flip-flop 38 is responsive to the voltage at the collector of transistor 32 as inverted by inverter 36. Flip-flop 38 may be any flip-flop with set and reset terminals, but the MC14013 flip-flop manufactured by Motorola may be conveniently used. The voltage at the collector of transistor 34 is inverted by inverter 40 and is then directed to the reset terminal of flip-flop 38. The Q output of flip-flop 38 is connected to driver 42 which provides standard signals indicative of zeros and ones before the decoded data is supplied to computer 10. Drivers 14 and 42 may be any drivers known in the art, but may, for example, be the MC1488 chips manufactured by Motorola.

To summarize the overall operation, data supplied by computer 10 through line driver 12 has either a positive or negative voltage level representative of either a one or zero data bit. When this data is recorded on magnetic tape, transition from the negative voltage to a positive voltage, (i.e., from a zero to a one) causes a positive flux transition, whereas transition from a one to a zero causes a negative flux transition. These flux transitions produce signals at the output of recorder 20, upon reading, which trigger the decoding circuit. A read flux transition causes a voltage spike of either a negative or positive polarity to appear at the output of recorder 20 as the previously recorded data dictates.

When data is desired from a tape, voltage transistions indicative of the flux reversals on the tape is supplied to transformer 22. Positive transitions pass through diode 28 causing transistor 32 to conduct and a positive pulse results at the output of inverter 36 which sets flip-flop 38. A negative flux reversal is inverted by the interconnection of diodes 24 and 26, and the resulting inverted pulse passes through diode 30 to cause transistor 34 to conduct. Inverter 40 produces a pulse which resets flip-flop 38. Thus, the output of driver 42 is a reproduction of the data originally supplied to the recorder circuitry.

Since recorder 20 has an AC coupled output, it decays upon the occurrence of a long string of either successive zeroes or ones. This, however, does not affect the accuracy of the reading and decoding process. Since a string of continuous ones or zeroes will not produce flux transition pulses, neither transistor 32 nor transistor 34 will conduct, so that the output of flip-flop 38 is constant. This corresponds to the data as initially supplied to the recorder.

Thus, the present invention permits high density recording on cassette magnetic tape of digital data using a standard audio recorder. Tests using a speed of 1.875 inches per second and a recording rate of 5,120 bits per inch of tape have produced error rates of no more than approximately 1 bit in every $10^8$ bits. One limitation in the density of the recorded bits at the standard speed is the frequency response of the recorder. In order to record at the industrial standard of 9,600 bits per second, the frequency response of the audio recorder must be at least 10 khz. To also record at a rate of 110 bits per second at the low end, the frequency response of the recorder must extend below 100 hz. If the recorder complies with these frequency response specifications (and many recorders on the market do), the instrument is perfectly suitable for use in computer data storage between the rate of 110 bits/sec and 9,600 bits/sec with a standard audio tape speed of 1.875 inches per second.

Although only one exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of the invention as defined in the following claims.

What is claimed is:

1. An apparatus for storing and recovering a digital signal indicative of digital data on magnetic recording tape comprising:
   means for recording said digital signal in respectively corresponding analog form onto said tape, without saturating said tape;
   playback means for reading said tape and generating a transition detection signal indicative of transitions in said analog form of said digital signal recorded on said tape, said playback means including a transformer responsive to the output read from said tape, two diodes having anodes commonly connected to ground and having cathodes connected across an output winding of said transformer, and two transistors having bases connected respectively to said two diode cathodes, emitters connected to ground and collectors connected respectively through resistors to a positive voltage and to ground; and means responsive to said transition signal for generating an output digital signal having transitions corresponding to the transitions of said digital signal to be stored and recovered, said output digital signal generating means comprising a flip-flop having set and reset terminals connected respectively to the collectors of said transistors.

2. Apparatus as in claim 1 wherein said recording and playback means comprises an audio cassette recorder having a frequency response to at least 10 kilohertz while recording at 1.875 inches per second.

3. Apparatus as in claim 1 wherein as many as 5,120 bits of data may be accurately recorded and later recovered in each inch of each track of data recorded on said tape.

4. An apparatus for storing and recovering a digital signal indicative of digital data on magnetic recording tape comprising:

magnetic tape recording and playback means having recording means wherein the residual magnetic intensity recorded on said tape is proportional to the amplitude of said digital signal;

positive and negative pulse translation means connected to said playback means output for producing a signal indicative of the occurrence of a positive voltage pulse and a negative voltage pulse, respectively, at said playback means output, said positive and negative pulse translation means comprising a transformer responsive to said playback means output, two diodes having anodes commonly connected to ground and having cathodes connected across an output winding of said transformer and two transistors having bases connected respectively to said two diode cathodes, emitters connected to ground and collectors connected respectively through resistors to a positive voltage and to ground; and digital data regeneration means responsive to said positive and negative pulse translation means for reproducing the data supplied to said recording means, said digital data regeneration means comprising a flip-flop having set and reset terminals, one of said set and reset terminals being connected to said positive pulse translation means and the other of said set and reset terminals being connected to said negative pulse translation means.

5. Apparatus as in claim 4 wherein said recording and playback means comprises an audio cassette recorder having a frequency response to extending between at least 100 hertz and 10 kilohertz while recording at 1.875 inches per second.

6. Method as in claim 4 wherein as many as 5,120 bits of data may be accurately recorded and later retrieved in each inch of each track on said tape.

7. In a computer system wherein digital data is stored on magnetic recording tape, an apparatus for storing and recovering data on said tape comprising:

magnetic tape recording and playback means having recording means wherein the residual magnetic intensity recorded on said tape is proportional to the amplitude of the electrical current causing said recording;

positive and negative pulse detection means connected to said playback means output for producing a signal indicative of the occurrence of a positive voltage pulse and a negative voltage pulse, respectively, at said playback means output, said positive and negative voltage pulse detection means comprising a transformer responsive to said playback means output, two diodes having anodes commonly connected to ground and having cathodes connected across an output winding of said transformer and two transistors having bases connected respectively to said two diode cathodes, emitters connected to ground and collectors connected respectively through resistors to a positive voltage and to ground; and regeneration means responsive to said positive and negative pulse detection means for reproducing the data supplied to said recording means, said regeneration means comprising a flip-flop having set and reset terminals, one of said set and reset terminals being connected to said positive pulse detection means and the other of said set and reset terminals being connected to said negative pulse detection means.

8. Apparatus as in claim 7 wherein said recording and playback means comprises an audio cassette recorder having a frequency response up to at least 10 kilohertz while recording at 1.875 inches per second.

9. Apparatus as in claim 7 wherein as many as 5,120 bits of data may be accurately recorded and later retrieved in each inch of each track on said tape.

* * * * *